United States Patent
Kawaguchi et al.

(10) Patent No.: US 6,890,839 B2
(45) Date of Patent: May 10, 2005

(54) METHOD AND APPARATUS FOR LASER ANNEALING CONFIGURATIONS OF A BEAM

(75) Inventors: Norihito Kawaguchi, Tokyo (JP); Kenichiro Nishida, Tokorozawa (JP); Mikito Ishii, Yokohama (JP); Takehito Yagi, Odawara (JP); Miyuki Masaki, Tokyo (JP); Atsushi Yoshinouchi, Chiba (JP); Koichiro Tanaka, Atsugi (JP)

(73) Assignee: Ishikawajima-Harima Heavy Industries Co., Ltd., Tokyo (JP)

( * ) Notice: Subject to any disclaimer, the term of this patent is extended or adjusted under 35 U.S.C. 154(b) by 221 days.

(21) Appl. No.: 10/257,460

(22) PCT Filed: Jan. 15, 2002

(86) PCT No.: PCT/JP02/00189

§ 371 (c)(1),
(2), (4) Date: Oct. 11, 2002

(87) PCT Pub. No.: WO02/056355

PCT Pub. Date: Jul. 18, 2002

(65) Prior Publication Data

US 2003/0132209 A1 Jul. 17, 2003

(30) Foreign Application Priority Data

Jan. 12, 2001 (JP) ............................................. 2001-5579

(51) Int. Cl.[7] ..................... H01L 21/00; H01L 21/331; H01L 21/20; H01L 21/26
(52) U.S. Cl. ..................... 438/487; 438/150; 438/166; 438/378; 438/487; 438/795
(58) Field of Search ................................. 438/150, 166, 438/378, 487, 795

(56) References Cited

U.S. PATENT DOCUMENTS

| | | | | |
|---|---|---|---|---|
| 5,888,839 A | * | 3/1999 | Ino et al. | 438/30 |
| 6,071,796 A | * | 6/2000 | Voutsas | 438/487 |
| 6,117,752 A | * | 9/2000 | Suzuki | 438/487 |
| 6,172,820 B1 | * | 1/2001 | Kuwahara | 359/719 |
| 6,190,949 B1 | * | 2/2001 | Noguchi et al. | 438/487 |
| 6,248,606 B1 | * | 6/2001 | Ino et al. | 438/30 |
| 6,341,042 B1 | * | 1/2002 | Matsunaka et al. | 359/618 |
| 6,411,906 B1 | * | 6/2002 | Goto | 702/28 |
| 6,528,397 B1 | * | 3/2003 | Taketomi et al. | 438/487 |
| 6,548,830 B1 | * | 4/2003 | Noguchi et al. | 257/66 |
| 6,580,053 B1 | * | 6/2003 | Voutsas | 219/121.66 |

FOREIGN PATENT DOCUMENTS

JP 2001-127004 5/2001

* cited by examiner

Primary Examiner—John F. Niebling
Assistant Examiner—Stanetta Isaac
(74) Attorney, Agent, or Firm—McCormick, Paulding & Huber LLP (57) ABSTRACT

An object of the present invention is to provide a laser annealing method and apparatus capable of performing uniform beam emission. By means of the present invention, uniform beam application to a sample can be achieved because a linear cross-sectional configuration can be created in an optical system with a beam having a Gaussian distribution while areas of strong light intensity are avoided by rotating the beam from a laser light source at a prescribed angle by means of rotating means even when the beam pattern of the beam from the laser light source has a non-uniform intensity distribution.

15 Claims, 10 Drawing Sheets

METHOD AND APPARATUS FOR LASER ANNEALING CONFIGURATIONS OF A BEAM

FIELD OF THE INVENTION

The present invention relates to a laser annealing method and apparatus.

BACKGROUND OF THE INVENTION

High-power lasers such as excimer lasers, YAG lasers, and the like are presently becoming widespread not only in research applications, but in industrial applications as well. These fields of industrial utilization are expanding not only into general materials processing, but also into the medical and semiconductor fields.

When materials processing is performed using an excimer laser or similar beam, the beam is transformed in a linear cross-sectional dimension by means of an optical system, with scanning in the latitudinal direction (width direction). The longitudinal direction and the latitudinal direction of the beam cross-section are each severally divided by a cylindrical lens to obtain a high degree of uniformity in the longitudinal direction and latitudinal direction of the beam pattern when the laser beam is transformed to a linear cross-sectional configuration.

Figure 7:
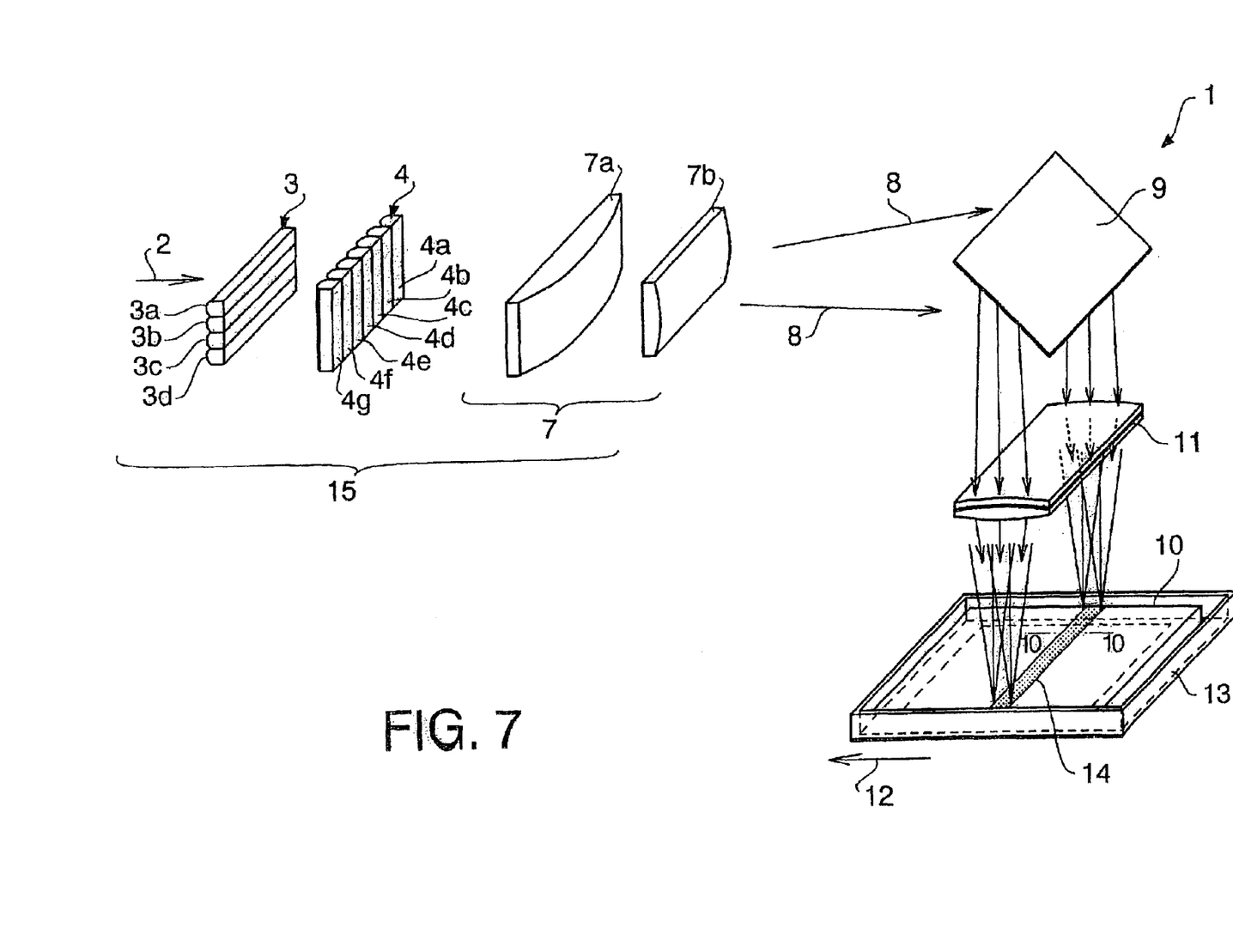
FIG. 7 is a conceptual diagram of an apparatus operating according to the conventional laser annealing method.

FIG. 7 is a conceptual diagram of an apparatus operating according to the conventional laser annealing method (refer to Japanese Patent Application Laid-open No. H8-195357).

The apparatus 1 depicted in the diagram is designed such that a beam 2 from a YAG laser (not shown) is divided into four parts in a vertical direction by a lens group 3 comprising four cylindrical lenses 3a–3d, further subdivided into seven parts in a horizontal direction by a lens group 4 comprising seven cylindrical lenses 4a–4g, and combined by a paired lens 7 comprising a pair of cylindrical lenses 7a and 7b disposed orthogonally to the generatrix, yielding a beam pattern whose light intensity is uniform in the longitudinal direction and the latitudinal direction. (Lens groups 3 and 7 comprise a homogenizer 15.) A beam 8 whose light intensity is uniformized is deflected by a reflecting mirror 9 towards a sample 10 and focused by a cylindrical lens 11 such that the sample 10 placed on a translation stage 13 that moves in the direction of arrow 12 is irradiated by a linear beam 14.

Due to the occurrence of transverse expansion when a YAG laser is used in this arrangement, the shape of the beam in the direction of the minor axis may correspond to that of a Gaussian beam.

Figure 8A:
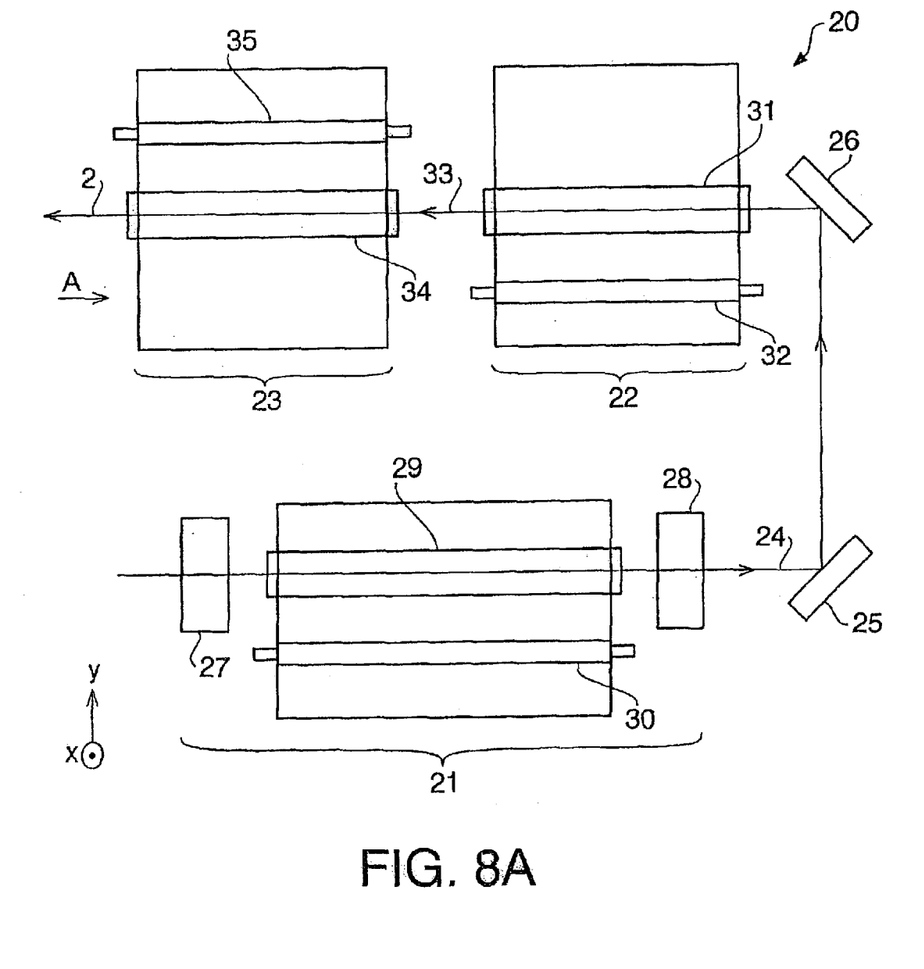
FIG. 8A is a block diagram of a pulse YAG laser as the laser light source.
Figure 8B:
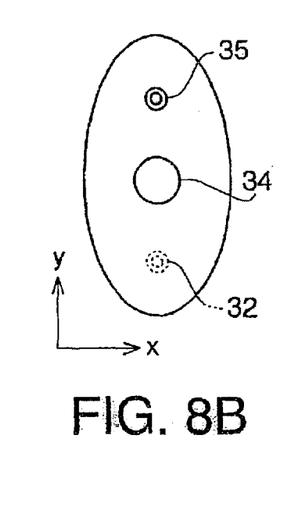
FIG. 8B is an arrow view of a laser amplifier on the output side of the YAG laser depicted in FIG. 8A in the direction of arrow A.
Figure 9A:
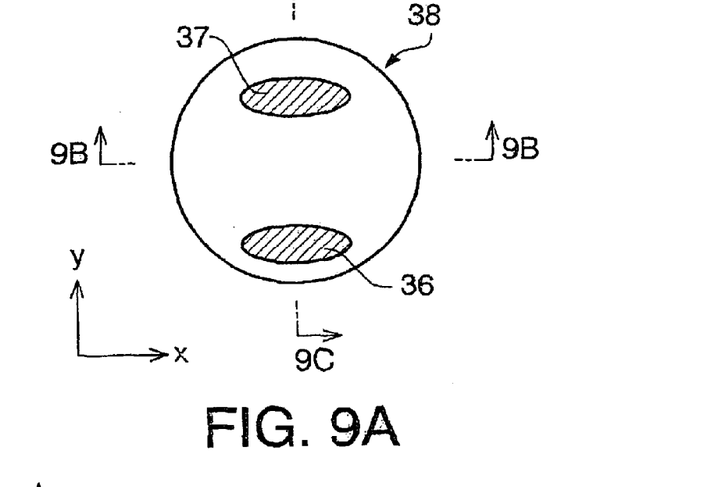
FIG. 9A is a diagram depicting the beam pattern of the YAG laser.
Figure 9B:
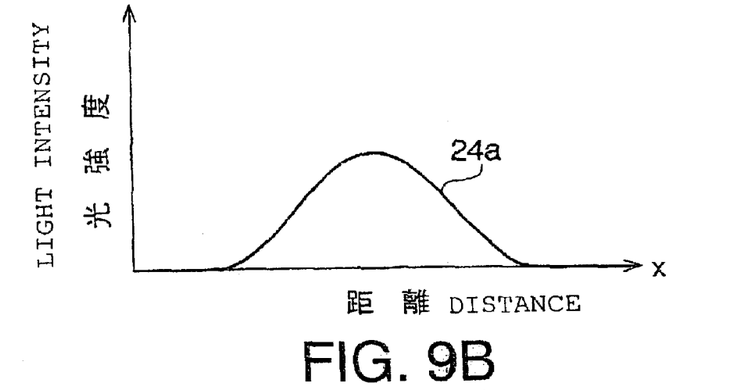
FIG. 9B is an intensity distribution diagram of the beam pattern along the line 9B—9B depicted in FIG. 9A.
Figure 9C:
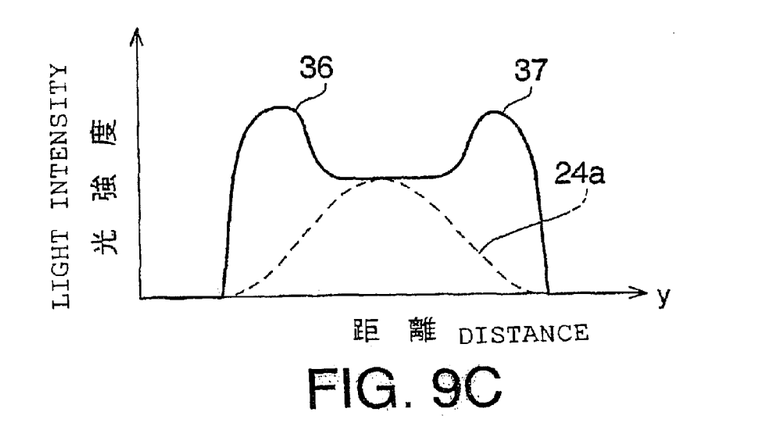
FIG. 9C is an intensity distribution diagram of the beam pattern along the line 9C—9C depicted in FIG. 9A.

FIG. 8A is a block diagram of a pulse YAG laser (hereafter referred to as "YAG laser") as a laser light source, and FIG. 8B is an arrow view of a laser amplifier on the output side of the YAG laser depicted in FIG. 8A in the direction of arrow A. FIG. 9A is a diagram depicting the beam pattern of the YAG laser; FIG. 9B is an intensity distribution diagram of the beam pattern along the line 9B—9B depicted in FIG. 9A; and FIG. 9C is an intensity distribution diagram of the beam pattern along the line 9C—9C depicted in FIG. 9A. In FIGS. 9B and 9C, distance is plotted on the horizontal axis, and light intensity is plotted on the vertical axis.

It is apparent from FIG. 9B that the beam 24 of the YAG laser has a Gaussian distribution 24a, and from FIG. 9C that the light intensity thereof has large peaks 36 and 37 on both ends (the top and bottom ends in FIG. 9A).

This is because flash lamps 32 and 35 for excitation are disposed at both sides of NdYAG rods 31 and 34.

A description will now be given of the YAG laser depicted in FIGS. 8A and 8B.

The YAG laser 20 comprises an output laser oscillator 21 for oscillating a pulsed YAG laser, two laser amplifiers 22 and 23, and reflecting mirrors 25 and 26 for deflecting the path of the beam 24 from the output laser oscillator 1 and inputting the resultant beam into the laser amplifier 22 of the preceding stage.

The output laser oscillator 21 comprises a resonator comprising a total reflection mirror 27 and a diffusion (output) mirror 28, an NdYAG rod 29 disposed at the central axis of the resonator; and a flash lamp 30 for generating pulsed light flashes as excitation light arranged parallel with (in the y-axis) and beneath the NdYAG rod 29.

The laser amplifier 22 of the preceding stage comprises an NdYAG rod 31 disposed along the optical axis of the beam 24 from the reflecting mirror 26, and a flash lamp 32 arranged parallel with (in the y-axis) and beneath the NdYAG rod 31.

The later-described laser amplifier 23 comprises a NdYAG rod 34 disposed along the optical axis of the beam 33 arriving from the laser amplifier 22 of the preceding stage, and a flash lamp 35 arranged parallel with (in the y-axis) and beneath the NdYAG rod 34.

For this reason, the strong portions of the light intensity from the excitation light of the flash lamps 32 and 35 are superimposed on both ends of the beam 24 (depicted by the broken line) emitted from the YAG laser 20 and provided with the Gaussian distribution 24a, thus generating large peaks 36 and 37 as depicted in FIG. 9A on the upper and lower ends (in the y-axis) of the beam pattern 38.

Figure 10:
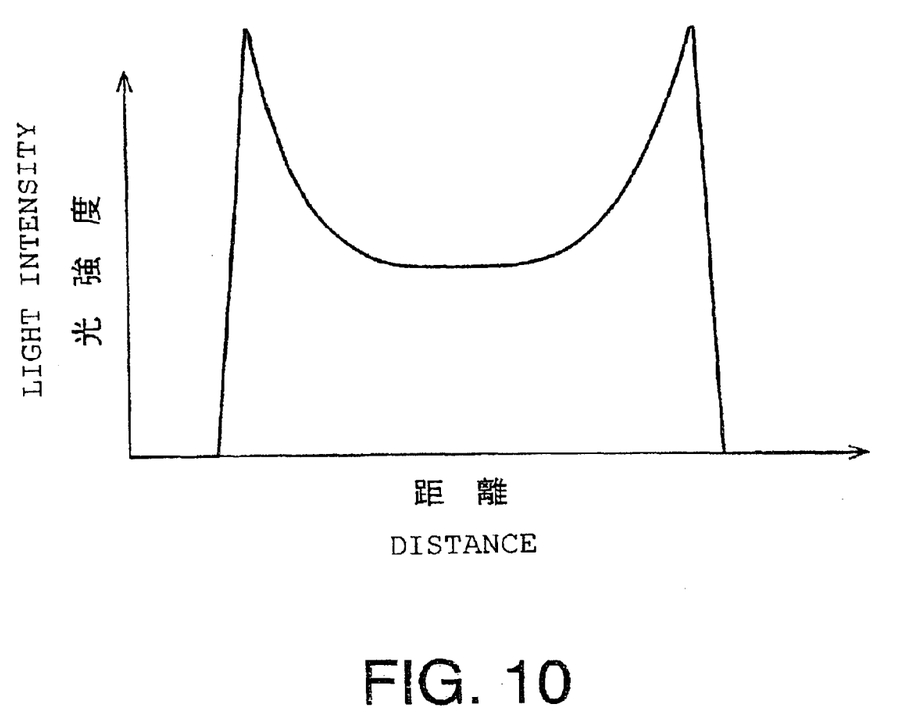
FIG. 10 is a diagram depicting the light intensity along the line 10—10 of a linear cross-sectional beam applied to a sample from the laser annealing apparatus depicted in FIG. 7.

A linear beam having large, streaked peaks on both latitudinal (in the direction of arrow 12) ends thereof in the manner depicted in FIG. 10 is radiated to the sample 10 when a beam 24 having large peaks 36 and 37 is directly transformed to a linear cross-sectional configuration with the aid of cylindrical lens groups 3–6 or a paired lens 7 such as those depicted in FIG. 7. A resulting problem is that the sample 10 undergoes ablation (a phenomenon in which scattering and surface roughening occur in areas within the portion of the sample 10 exposed to the beam 14 that are irradiated by the streaked-peaks, specifically, the longer ends). FIG. 10 is a diagram depicting the light intensity (along the line 10—10) of a linear cross-sectional beam applied to a sample 10 from a laser annealing apparatus as depicted in FIG. 7.

SUMMARY OF THE INVENTION

An object of the present invention is to provide a laser annealing method and apparatus capable of performing uniform beam emission, overcoming the aforementioned problems.

The laser annealing method of the present invention comprises transforming the cross-sectional configuration of a beam from a laser light source to a linear cross-sectional configuration by means of an optical system, and annealing a sample by applying the resulting linear cross-sectional beam thereto, wherein the laser annealing method entails transforming the beam from the laser light source to a linear cross-sectional configuration by means of an optical system after being rotated by rotating means at a prescribed angle.

The laser annealing apparatus of the present invention comprises a laser light source and an optical system for transforming the cross-sectional configuration of a beam from the laser light source to a linear configuration and annealing a sample by applying the resulting linearly configured beam thereto, wherein rotating means for rotating the cross-sectional configuration of the beam from the laser light source about the central axis of the beam at a prescribed angle are provided in the laser annealing apparatus between the laser light source and the optical system thereof.

In addition to the above structure, the optical system of the laser annealing apparatus of the present invention may comprise a plurality of cylindrical lens groups arranged parallel to one another and orthogonal with respect to the optical axis of the beam, and designed for dividing the beam in the arrangement direction; and a lens disposed on the transmission side of the cylindrical lens groups and designed for combining the divided beam.

In addition to the above structure, the rotating means of the laser annealing apparatus of the present invention may comprise a first mirror for deflecting the beam from the laser light source orthogonally with respect to the optical axis of the beam; a second mirror for deflecting the reflected beam from the first mirror orthogonally with respect to the plane containing the optical axis of the beam from the laser light source and the optical axis of the reflected beam from the first mirror; a third mirror for deflecting the reflected beam from the second mirror orthogonally within a plane identical to the plane containing the optical axis of the reflected beam from the first mirror and the optical axis of the reflected beam from the second mirror; and a fourth mirror for deflecting the reflected beam from the third mirror orthogonally within a second plane.

In addition to the above structure, the fourth mirror of the laser annealing apparatus of the present invention may be provided to a moving means capable of moving along the direction of the optical axis of the reflected beam from the third mirror.

In addition to the above structure, the rotating means of the laser annealing apparatus of the present invention may comprise a first mirror for deflecting the beam from the laser light source orthogonally with respect to the optical axis of the beam; and a second mirror for deflecting the reflected beam from the first mirror orthogonally with respect to a first plane containing the optical axis of the beam from the laser light source and the optical axis of the reflected beam from the first mirror.

In addition to the above structure, the second mirror of the laser annealing apparatus of the present invention may be provided to a moving means capable of moving along the direction of the optical axis of the reflected beam from the first mirror.

In addition to the above structure, the laser light source of the laser annealing apparatus of the present invention preferably comprises a YAG laser light source, an Nd glass laser, or a Q-switch solid-state laser.

By means of the present invention, uniform beam emission can be achieved because a beam having a Gaussian distribution can be utilized and a linear cross-sectional configuration formed in an optical system by rotating the beam from a laser light source at a prescribed angle with the aid of rotating means even when the beam pattern of the beam from the laser light source has a nonuniform intensity distribution.

DETAILED DESCRIPTION OF THE PREFERRED EMBODIMENTS

Embodiments of the present invention will be described in detail hereafter based on the accompanying figures.

Figure 1:
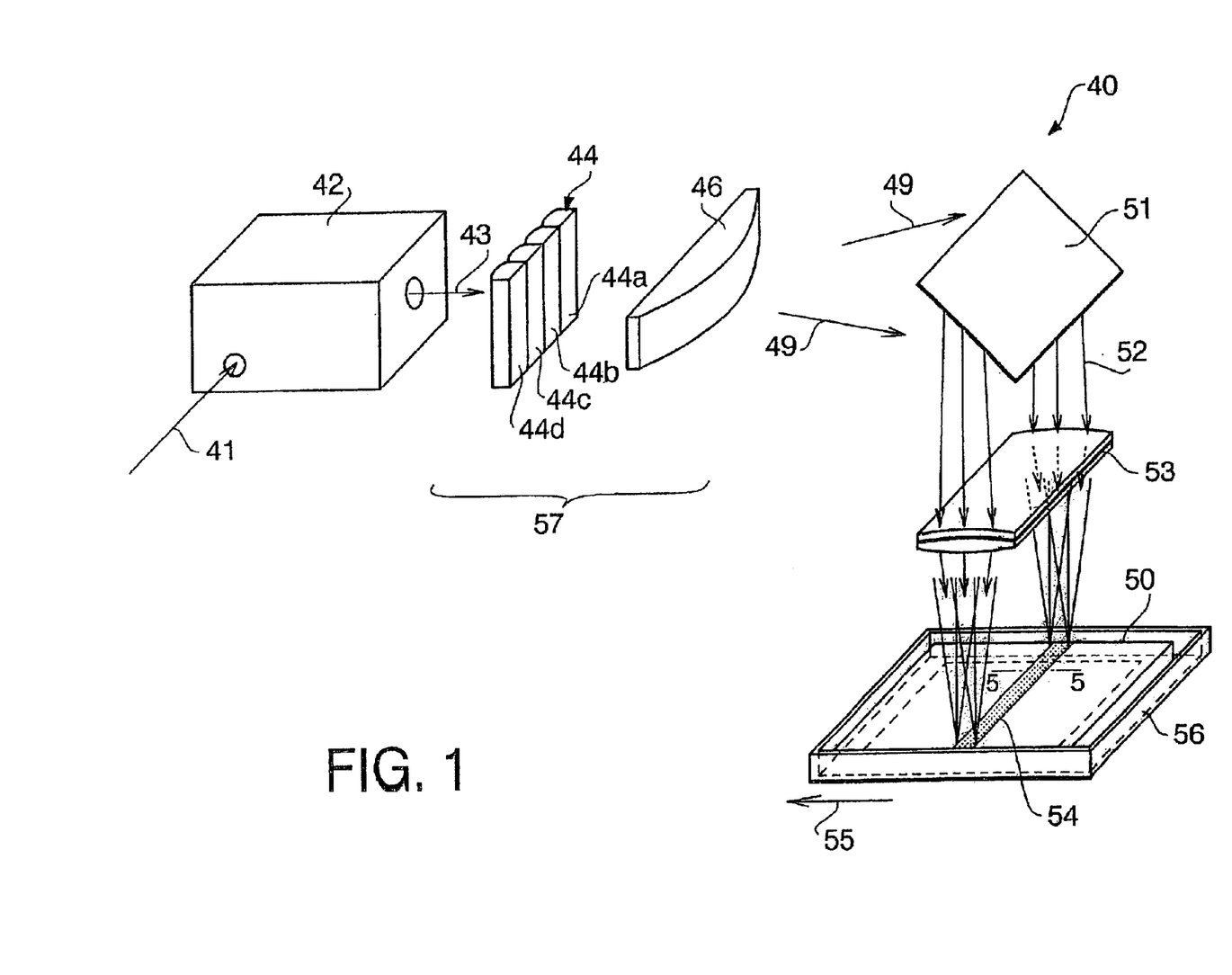
FIG. 1 is a conceptual diagram depicting an embodiment of the laser annealing apparatus adopting the laser annealing method of the present invention.

FIG. 1 is a conceptual diagram depicting an embodiment of the laser annealing apparatus adopting the laser annealing method of the present invention. The present embodiment is described with reference to a case in which a Near Field pulse YAG laser is used as the laser light source.

The laser annealing apparatus 40 depicted in the same diagram comprises a Near Field pulse YAG laser (hereafter referred to as "YAG laser") 20 (as seen in FIG. 8A); rotating means 42 for rotating a beam 41 from the YAG laser 20 at a prescribed angle; a lens group 44 for dividing the beam 43 from the rotating means 42 into four parts in a horizontal direction (the number of divisions is not limited), composed of cylindrical lenses 44a–44d; a cylindrical lens 46 for transforming the beam from the lens group 44 into a linear cross-sectional configuration by combining the beam, disposed orthogonally to the generatrix; a total reflection mirror 51 for deflecting the beam 49 from the cylindrical lens 46 towards a sample 50; a cylindrical lens 53 for laser annealing by focusing the beam 52 from the total reflection mirror 51 and applying the beam to the sample 50; and a translation stage 56 that moves in the latitudinal direction (the direction of the arrow 55) of the linear cross-sectional beam 54 focused on the sample 50. The lens group 44 and the cylindrical lens 46 also comprise a homogenizer 57 as the optical system.

Figure 2A:
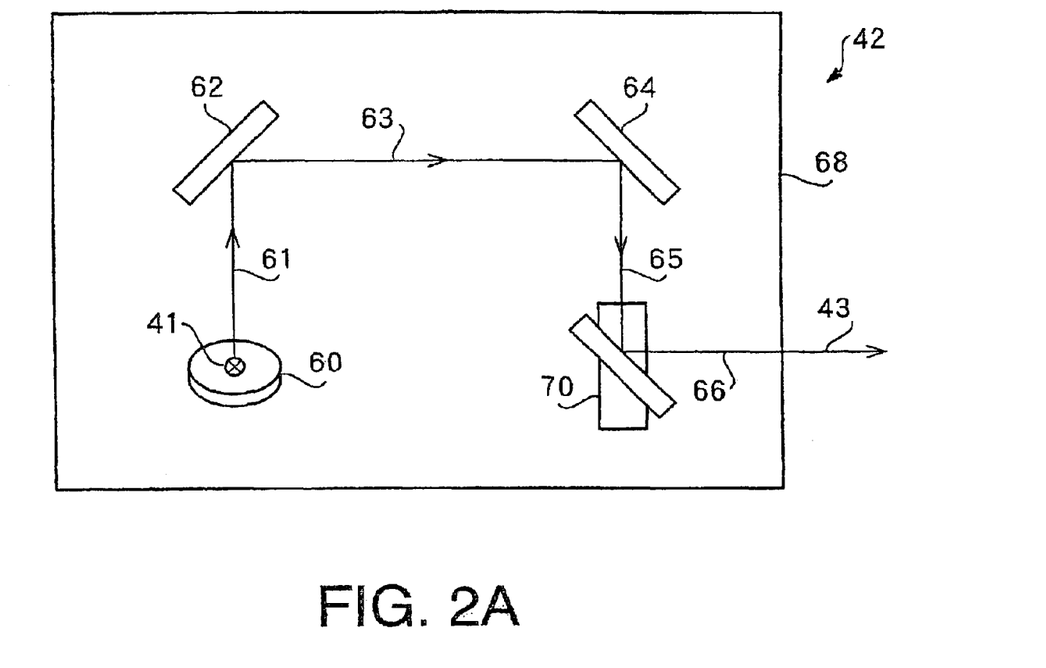
FIG. 2A is a side view of the rotating means used in the laser annealing apparatus depicted in FIG. 1.
Figure 2B:
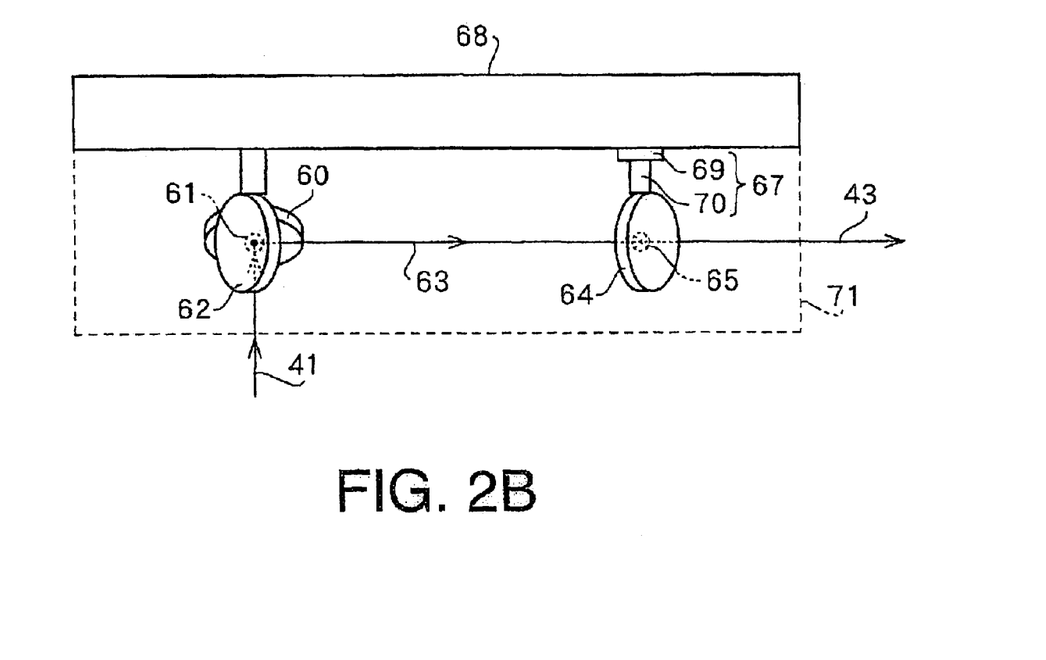
FIG. 2B is a plan view of FIG. 2A.
Figure 3A:
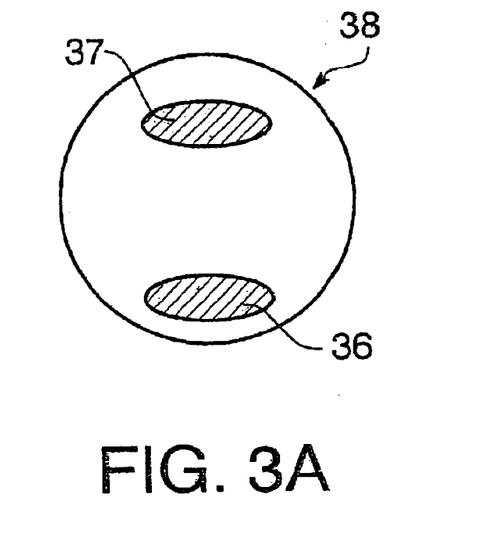
FIG. 3A is a cross-sectional view of a beam incident on the rotating means depicted in FIG. 2A.
Figure 3B:
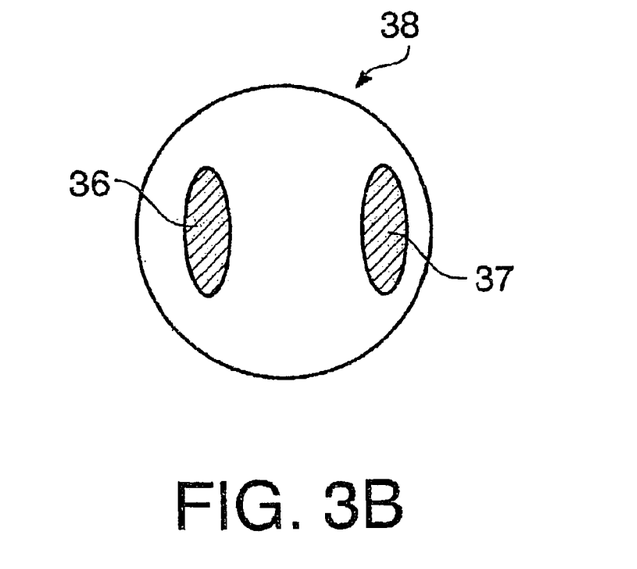
FIG. 3B is a cross-sectional view of a beam exiting the rotating means depicted in FIG. 2A.

FIG. 2A is a side view of the rotating means used in the laser annealing apparatus depicted in FIG. 1; and FIG. 2B is a plan view of FIG. 2A. FIG. 3A is a cross-sectional view of a beam incident on the rotating means depicted in FIG. 2A; and FIG. 3B is a cross-sectional view of a beam exiting the rotating means depicted in FIG. 2A.

The rotating means 42 may comprise, for example, a first mirror 60 for deflecting the beam 41 from the YAG laser orthogonally and upward with respect to the optical axis of the beam 41; a second mirror 62 for deflecting the beam 61 reflected by the first mirror 60 orthogonally with respect to a first plane containing the optical axis of the beam 41 and the optical axis of the beam 61 reflected by the first mirror 60; a third mirror 64 for deflecting the beam 63 reflected by the second mirror 62 orthogonally and downward within a plane identical to a second plane containing the optical axis of the beam 61 reflected by the mirror 60 and the optical axis of the beam 63 reflected by the second mirror 62; a fourth mirror 66 for deflecting the beam 65 reflected by the third mirror 64 orthogonally within the second plane; and moving means 67 for moving the fourth mirror 66 upward and downward along the direction of the optical axis of the beam 65 reflected by the third mirror 64.

The moving means 67 for adjusting the height of the beam 43 comprises a rail 69 mounted along the breadboard 68 of the rotating means 42; and a support 70 for supporting the fourth mirror 66, slidably mounted to the rail 69, 71, shown by the broken line, is a cover.

When the laser annealing apparatus 40 depicted in FIG. 1 is activated, the beam (see FIG. 3A) from the YAG laser (see FIG. 8) 20 enters the first mirror 60 of the rotating means 42, reflects vertically upward, and enters the second mirror 62. The beam 61 incident on the second mirror 62 is rotated 90 degrees (see FIG. 3B) by being reflected horizontally along the breadboard 68. The rotated beam enters the third mirror 64. The beam 63 thus incident on the third mirror 64 is reflected vertically downward to enter the fourth mirror 66. The beam 65 thus incident on the fourth mirror 66 is then reflected horizontally along the breadboard 68 and enters the lens group 44 as the beam 43.

The beam 43 incident on the lens group 44 enters the cylindrical lens 46 after being divided into four parts. The beam incident on the cylindrical lens 46 assumes a configuration wherein the beam pattern has a linear form with uniform light intensity in the longitudinal direction (see FIG. 5).

The operating principle of the homogenizer 57 will now be described.

Figures 4A, 4B:
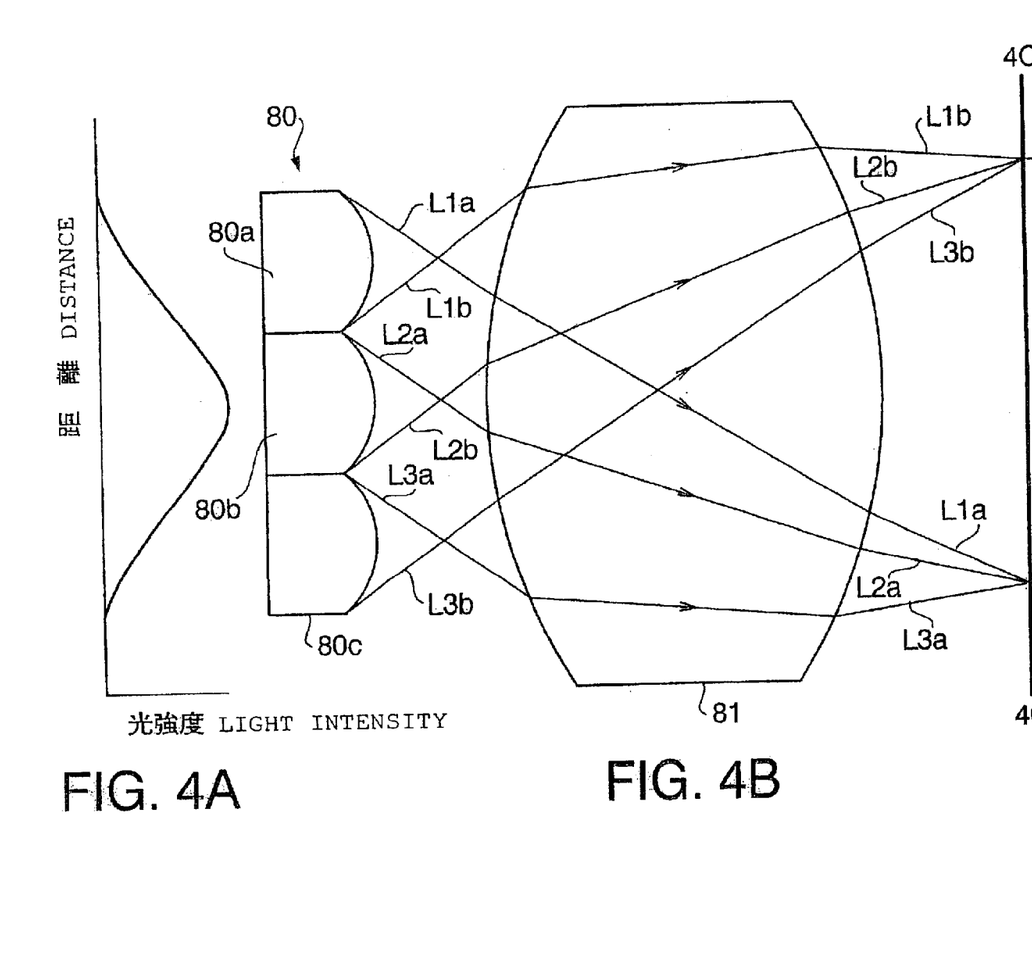
FIG. 4A is a diagram depicting the intensity distribution of the incident light.
FIG. 4B is a diagram depicting the optical path of a beam passing through the homogenizer.
Figure 4C:
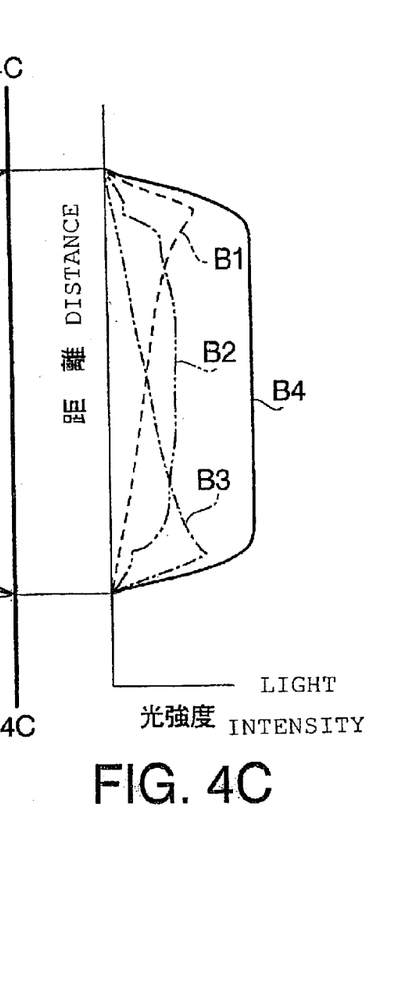
FIG. 4C is a diagram depicting the intensity distribution of the beam along the line 4C—4C after passing through the homogenizer.

FIGS. 4A, 4B, and 4C are diagrams for describing the operating principle of a homogenizer. The case considered here is that of an incident beam having a Gaussian-type intensity distribution. FIG. 4A is a diagram depicting the intensity distribution of incident light; FIG. 4B is a diagram depicting the optical path of a beam passing through the homogenizer; and FIG. 4C is a diagram depicting the intensity distribution of the beam along the line 4C—4C after passing through the homogenizer. In FIGS. 4A and 4C, light intensity is plotted on the horizontal axis, and distance is plotted on the vertical axis.

A beam having a Gaussian distribution as depicted in FIG. 4A is focused along the line 4C—4C through the optical paths L1a, L1b, L2a, L2b, L3a, and L3b during passage through the lens 81 and the lens group 80 comprising the three cylindrical lenses 80a–80c depicted in FIG. 4B. The beam B1 transmitted in the light paths L1a and L1b, the beam B2 transmitted in the light paths L2a and L2b, and the beam B3 transmitted in the light paths L3a and L3b are thus superimposed to form a beam B4 having a substantially flat intensity distribution along the line 4C—4C.

The homogenizer is thus capable of forming a beam having a different intensity distribution by dividing the beam in the cylindrical lens group 80 and combining the beam again. The intensity distribution of the beam along the line 4C—4C can also be freely adjusted by adjusting the light path after division.

The x-axis direction and the y-axis direction of the beam are divided and a substantially flat characteristic beam is obtained in the homogenizer 15 of FIG. 7.

Figure 5:
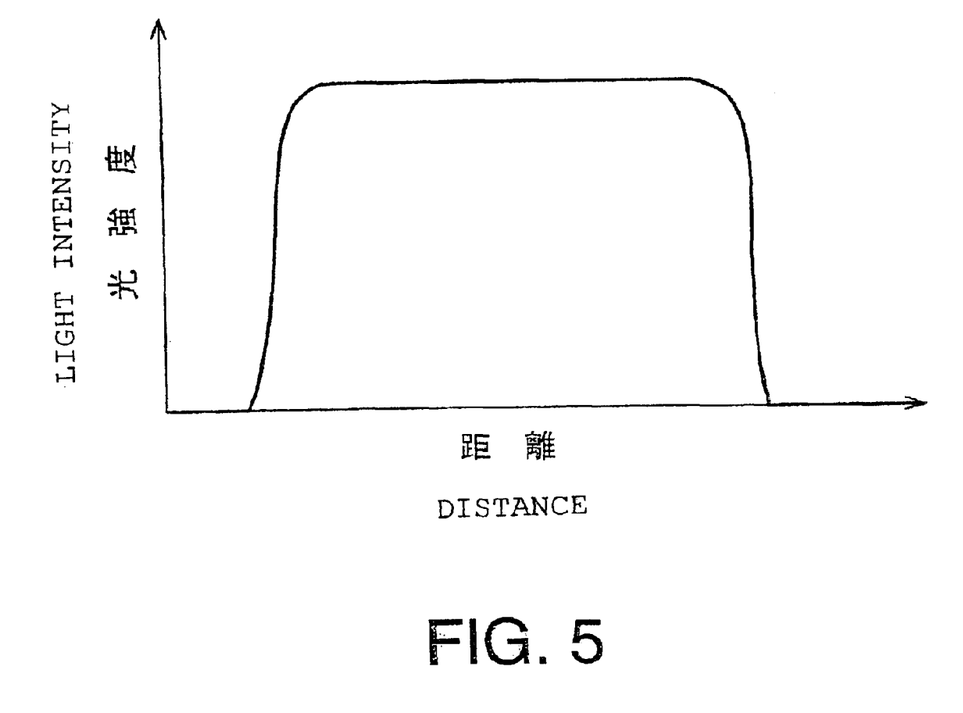
FIG. 5 is a diagram depicting the light intensity along the line 5—5 of a linear cross-sectional beam applied to a sample from the laser annealing apparatus depicted in FIG. 1.

A case will now be considered in which a homogenizer 57 for dividing only the x-axis direction is used, as in FIG. 1. When a beam enters the homogenizer through the beam pattern 38 having large intensity peaks 36 and 37 on the upper and lower ends thereof as shown in FIG. 3A, a linear cross-sectional beam having strong light intensity at both ends in the latitudinal direction thereof is obtained as previously described, because of the absence of division along the y-axis thereof. In contrast, when a beam that is rotated 90 degrees as depicted in FIG. 3B enters the homogenizer, a beam whose latitudinal direction naturally has a Gaussian-distributed light intensity is obtained because the light intensity along the y-axis direction thereof assumes a Gaussian distribution. A substantially flat characteristic beam as depicted in FIG. 5 is also ultimately obtained because of division thereof by means of the homogenizer, although the light intensity of the beam will have large peaks at both ends in the x-axis method.

The beam 49 from the lens group 44 and the cylindrical 46 depicted in FIG. 1 is reflected towards the sample 50 (downward in the figure) by the reflecting mirror 51, focused in the cylindrical lens 53, and applied to the sample 50. No ablation occurs because a linear cross-sectional beam with a uniform light intensity is applied to the sample 50. Being able to operate with fewer lenses in comparison to the conventional laser annealing apparatus depicted in FIG. 7 also makes further miniaturization possible.

Figure 6A:
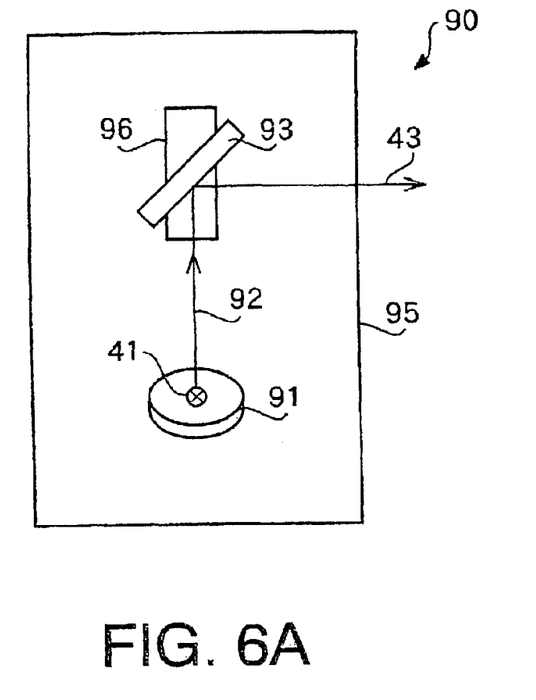
FIG. 6A is a conceptual diagram depicting another embodiment of the rotating means depicted in FIGS. 2A and 2B.
Figure 6B:
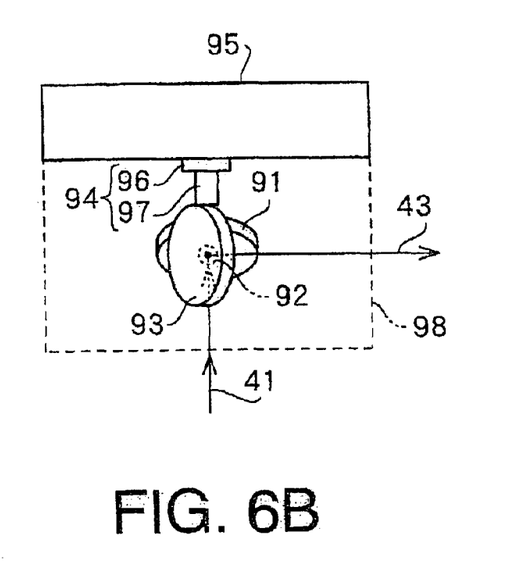
FIG. 6B is a plan view of FIG. 6A.

FIG. 6A is a conceptual diagram depicting another embodiment of the rotating means depicted in FIGS. 2A and 2B. FIG. 6B is a plan view of FIG. 6A.

The difference with respect to the rotating means depicted in FIGS. 2A and 2B is that this structure comprises only two mirrors.

Specifically, the rotating means 90 comprises a first mirror 91 for deflecting the beam 41 from the laser light source orthogonally with respect to the optical axis of the beam 41; and a second mirror 93 for deflecting the beam 92 reflected by the first mirror 91 orthogonally with respect to a first plane containing the optical axis of the beam 41 from the laser light source and the optical axis of the beam 92 reflected by the first mirror 91. The second mirror 93 is provided to a moving means 94 capable of moving along the direction of the optical axis of the beam 92 reflected by the first mirror 91. The moving means 94 is designed to adjust the height of the beam 43 and is composed of a rail 96 mounted along the breadboard 95 of the rotating means 90, and a support 97 designed to support the second mirror 93 and slidably mounted to the rail 96 in the same manner as shown in FIGS. 2A and 2B. 98, shown by the broken line, is a cover.

Not only does using this type of rotating means 90 yield the same effects as the rotating means 42 depicted in FIGS.

2A and 2B, but operating with only two mirrors enables further miniaturization.

By means of the present invention above:

(1) An irregular state of distribution of a linear beam in which strong areas of intensity occur at both ends, as seen in the beam pattern of a YAG laser, can be overcome; and (2) The direction of the Gaussian distribution in the original beam can be utilized directly, without division or processing, because the direction of the intensity distribution of the beam pattern can be rotated.

The present embodiment was described with reference to a 90 degree angle of rotation, but the present invention is in no way limited by this option alone and can be used as long as it is possible to obtain an angle of rotation that allows deviations in the intensity distribution of the beam to be corrected. The present embodiment was also described with reference to a Near Field pulse YAG laser as a laser light source, but the present invention is in no way limited by this option alone and may be adapted to laser light sources whose beam patterns have a nonuniform intensity distribution, such as Nd glass lasers, Q-switch solid-state lasers, and the like.

The claim of priority for the present application is based on Japanese Patent Application No. 2001-5579 (filed Jan. 12, 2001), and the details of the Japanese Application are contained in the description of the present application.

INDUSTRIAL APPLICABILITY

The present invention is applicable to a laser annealing method and apparatus.

What is claimed is:

1. A laser annealing method, comprising transforming the cross-sectional configuration of a beam from a laser light source to a linear cross-sectional configuration by means of an optical system, and annealing a sample by applying the resulting linear cross-sectional beam thereto, wherein said laser annealing method is characterized in that the beam from the laser light source is transformed to a linear cross-sectional configuration by means of the optical system after said beam is rotated about its optical axis by a rotating means at a prescribed angle.

2. A laser annealing apparatus for transforming the cross-sectional configuration of a beam from a laser light source to a linear configuration and annealing a sample by applying the resulting linearly configured beam thereto, wherein said laser annealing apparatus is characterized in that a rotating means for rotating the beam from the laser light source about said beam's optical axis and at a prescribed angle is provided between the laser light source and the optical system.

3. The laser annealing apparatus according to claim 2, wherein the optical system comprises a plurality of cylindrical lens groups arranged parallel to one another and orthogonal to the optical axis of the beam and designed for dividing the beam in the arrangement direction; and a lens disposed on the transmission side of said cylindrical lens groups and designed, for combining the divided beams.

4. The laser annealing apparatus according to claim 2 wherein the rotating means comprise a first mirror for deflecting the beam from the laser light source orthogonally with respect to the optical axis of said beam; a second mirror for deflecting the reflected beam from the first mirror orthogonally with respect to a first plane containing the optical axis of the beam from the laser light source and the optical axis of the reflected beam from the first mirror; a third mirror for deflecting the reflected beam from the second mirror orthogonally within the same plane as a second plane containing the optical axis of the reflected beam from the first mirror and the optical axis of the reflected beam from the second mirror; and a fourth mirror for deflecting the reflected beam from the third mirror orthogonally within the second plane.

5. The laser annealing apparatus according to claim 3 wherein the rotating means comprise a first mirror for deflecting the beam from the laser light source orthogonally with respect to the optical axis of said beam; a second mirror for deflecting the reflected beam from the first mirror orthogonally with respect to a first plane containing the optical axis of the beam from the laser light source and the optical axis of the reflected beam from the first mirror; a third mirror for deflecting the reflected beam from the second mirror orthogonally within the same plane as a second plane containing the optical axis of the reflected beam from the first mirror and the optical axis of the reflected beam from the second mirror; and a fourth mirror for deflecting the reflected beam from the third mirror orthogonally within the second plane.

6. The laser annealing apparatus according to claim 4, wherein the fourth mirror is provided to a moving means that are moved along the direction of the optical axis of the reflected beam from the third mirror.

7. The laser annealing apparatus according to claim 2, wherein the rotating means comprise a first mirror for deflecting the beam from the laser light source orthogonally with respect to the optical axis of said beam; and a second mirror for deflecting the reflected beam from the first mirror orthogonally with respect to a first plane containing the optical axis of the beam from the laser light source and the optical axis of the reflected beam from the first mirror.

8. The laser annealing apparatus according to claim 3, wherein the rotating means comprise a first mirror for deflecting the beam from the laser light source orthogonally with respect to the optical axis of said beam; and a second mirror for deflecting the reflected beam from the first mirror orthogonally with respect to a first plane containing the optical axis of the beam from the laser light source and the optical axis of the reflected beam from the first mirror.

9. The laser annealing apparatus according to claim 6, wherein the second mirror is provided to a moving means capable of moving along the direction of the optical axis of the reflected beam from the first mirror.

10. The laser annealing apparatus according to claim 2; wherein the laser light source comprises a YAG laser light source, an Nd glass laser, or a Q-switch solid-state laser.

11. The laser annealing apparatus according to claim 3; wherein the laser light source comprises a YAG laser light source, an Nd glass laser, or a Q-switch solid-state laser.

12. The laser annealing apparatus according to claim 4; wherein the laser light source comprises a YAG laser light source, an Nd glass laser, or a Q-switch solid-state laser.

13. The laser annealing apparatus according to claim 5; wherein the laser light source comprises a YAG laser light source, an Nd glass laser, or a Q-switch solid-state laser.

14. The laser annealing apparatus according to claim 6; wherein the laser light source comprises a YAG laser light source, an Nd glass laser, or a Q-switch solid-state laser.

15. The laser annealing apparatus according to claim 7; wherein the laser light source comprises a YAG laser light source, an Nd glass laser, or a Q-switch solid-state laser.

* * * * *

UNITED STATES PATENT AND TRADEMARK OFFICE
CERTIFICATE OF CORRECTION

PATENT NO. : 6,890,839 B2  Page 1 of 1
APPLICATION NO. : 10/257460
DATED : May 10, 2005
INVENTOR(S) : Norihito Kawaguchi et al.

It is certified that error appears in the above-identified patent and that said Letters Patent is hereby corrected as shown below:

Title Page, Item (73) Assignee:

Please add the following additional assignee:

--Semiconductor Energy Laboratory Co., Inc., Kanagawa, Japan--

Signed and Sealed this

Seventh Day of July, 2009

JOHN DOLL
*Acting Director of the United States Patent and Trademark Office*